United States Patent
Parker et al.

(12)

(10) Patent No.: US 6,545,697 B1
(45) Date of Patent: Apr. 8, 2003

(54) VIDEO TELEPHONY

(75) Inventors: Benjamin J. Parker, Overland Park, KS (US); Shane R. Werner, Olathe, KS (US); Chuck Diaz, St. Louis, MO (US); Terry M. Frederick, Lenexa, KS (US)

(73) Assignee: Sprint Communications Company, LP, Overland Park, KS (US)

( * ) Notice: Subject to any disclaimer, the term of this patent is extended or adjusted under 35 U.S.C. 154(b) by 0 days.

(21) Appl. No.: 09/978,616

(22) Filed: Oct. 16, 2001

(51) Int. Cl.[7] .................................................. H04N 7/14
(52) U.S. Cl. ................. 348/14.01; 348/14.12; 370/261; 370/352
(58) Field of Search ................. 348/14.01, 14.02, 348/14.03, 14.04, 14.05, 14.07, 14.08, 14.09, 14.1, 14.11, 14.12, 14.13; 370/352, 260, 261; H04N 7/14

(56) References Cited

U.S. PATENT DOCUMENTS 6,370,137 B1 * 4/2002 Lund .......................... 370/352

* cited by examiner

*Primary Examiner*—Melur Ramakrishnaiah
(74) *Attorney, Agent, or Firm*—Harley R. Ball; Steven J. Funk; Kevin D. Robb (57) ABSTRACT

A user system uses a called number to establish a telephone call over a public telephone network to a called party. In response to the telephone call, the user system transfers a video call request to a server system over a public data network. The server system uses the called telephone number to check a database to determine if the called party is ready to receive video calls. If the called party is ready and accepts the video call, the server system exchanges video between the caller and called parties over the public data network.

54 Claims, 10 Drawing Sheets

VIDEO TELEPHONY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of video telephony, and in particular, to video communications over a public data network in response to a telephone call placed over a public telephone network.

2. Description of the Prior Art

Video telephony comprises the exchange of both audio and video between a caller and called party. If video telephony were deployed on a large scale, it would dramatically improve user-to-user communications and provide greater efficiency to business entities. For example, large-scale video telephony would significantly reduce business travel expenses. Unfortunately, the mass deployment of video telephony has failed to materialize.

Various systems have been developed to provide video telephony. For example, computers can be used to place video calls over the Internet. Video telephones can be used to place video calls over video telephone networks. Unfortunately, these video telephony systems are complex to install and operate, and they are often expensive. The cost and complexity has inhibited mass deployment. There is a need for video telephony technology that is easier to install and operate, and that is more inexpensive than current systems.

SUMMARY OF THE INVENTION

The invention helps solve the above problems with video telephony technology that provides for the exchange of both audio and video between a caller and called party. From the user's perspective, this technology can be easy to install and operate. It can also be relatively inexpensive. Advantageously, the video telephony technology could be deployed on a massive scale to improve user-to-user communications and provide greater efficiency to business entities.

Some examples of the invention include a user system, its method of operation, and software that directs its operation. The user system receives a called telephone number contemporaneously used to establish a telephone call between a caller and a called party over a public telephone network wherein the caller is associated with a caller telephone number and the called party is associated with the called telephone number. The user system generates and transfers a first message indicating the called telephone number to a public data network for delivery to a server system in response to receipt of the called number. The user system receives and processes a second message from the public data network indicating that caller video can be transferred, and in response to the second message, transfers caller video to the public data network for delivery to the called party. The user system may receive and display called party video.

Some examples of the invention include a user device and its method of operation. The user device monitors a telephone line to detect dual-tone multi-frequency signals indicating a called telephone number contemporaneously being used to establish a telephone call between a caller and a called party over a telephone network. The user device generates and transfers a first message to indicate the called telephone number. The user device monitors the telephone line to detect an on-hook condition. The user device generates and transfers a second message to indicate the on-hook condition. The user device may include telephone jacks for coupling the user device into the telephone line and a port for coupling the user device to a computer connection.

Some examples of the invention include a server system, its method of operation, and software that directs its operation. A caller is associated with a caller data address and a caller telephone number, and a called party is associated with a called party data address and a called telephone number. The server system receives a first message indicating the called telephone number wherein the called telephone number is contemporaneously used to establish a telephone call between the caller and the called party over a public telephone network. The server system processes the called telephone number from the first message to determine if the called party will receive caller video. If the called party will receive the caller video, the server system transfers a second message for delivery to the called party and a third message for delivery to the caller wherein the second message and the third message indicate that the caller video will be transferred to the called party. The server system may determine if the caller will receive called party video. If the caller will receive the called party video, then the second message and the third message indicate that the called party video will be transferred to the caller.

In some other examples of the invention, the server system maintains a database of user telephone numbers and associated user data addresses. The server system maintains individual indications if individual ones of the users will receive video. The server system establish video exchanges between callers and called parties over a public data network in response to messages indicating called telephone numbers contemporaneously used to establish telephone calls between the callers and the called parties over a public telephone network.

BRIEF DESCRIPTION OF THE DRAWINGS

The same reference number represents the same element on all drawings.

DETAILED DESCRIPTION OF THE PREFERRED EMBODIMENT

FIGS. 1–10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
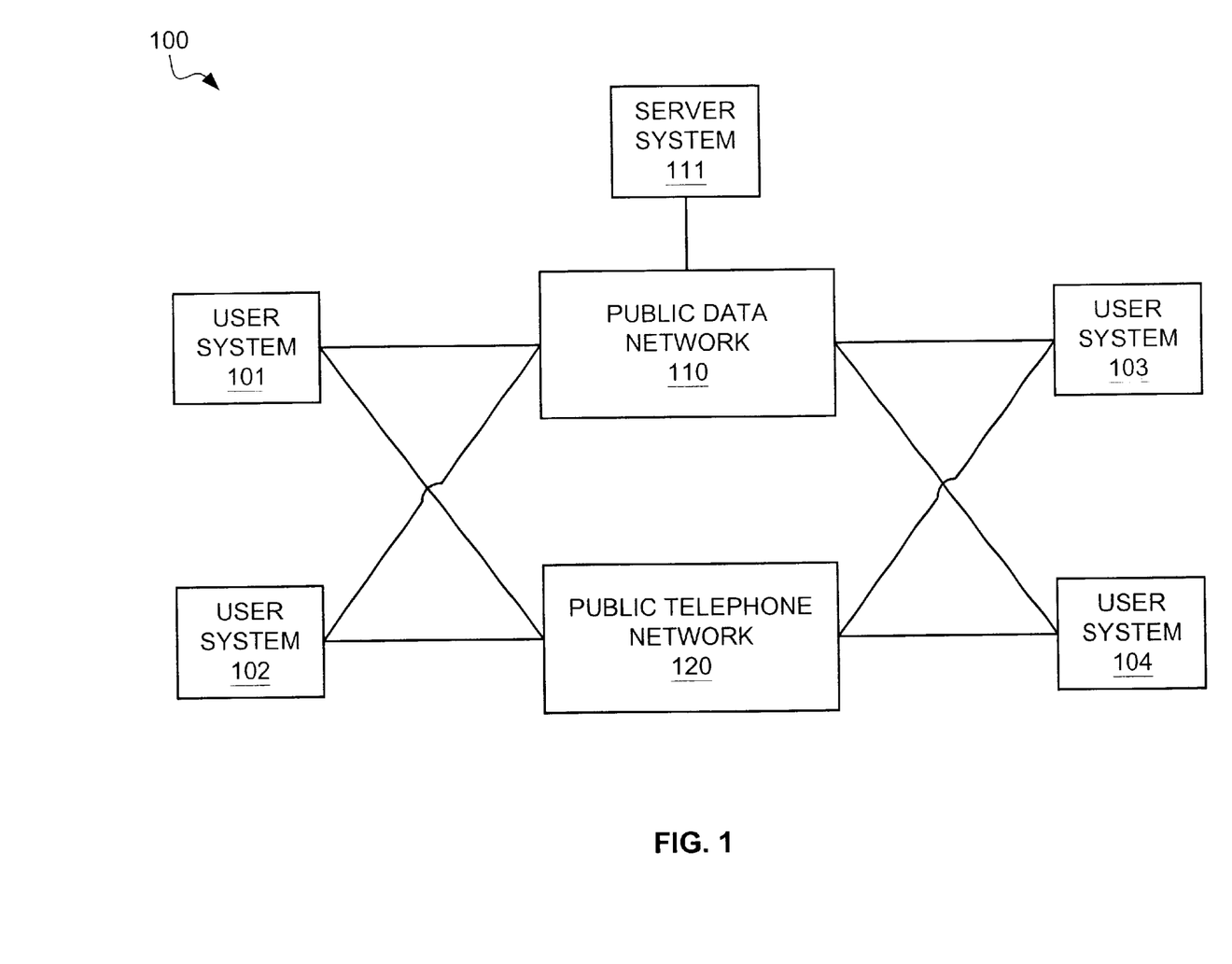
FIG. 1 illustrates a video telephony system in an example of the invention.
Figure 2:
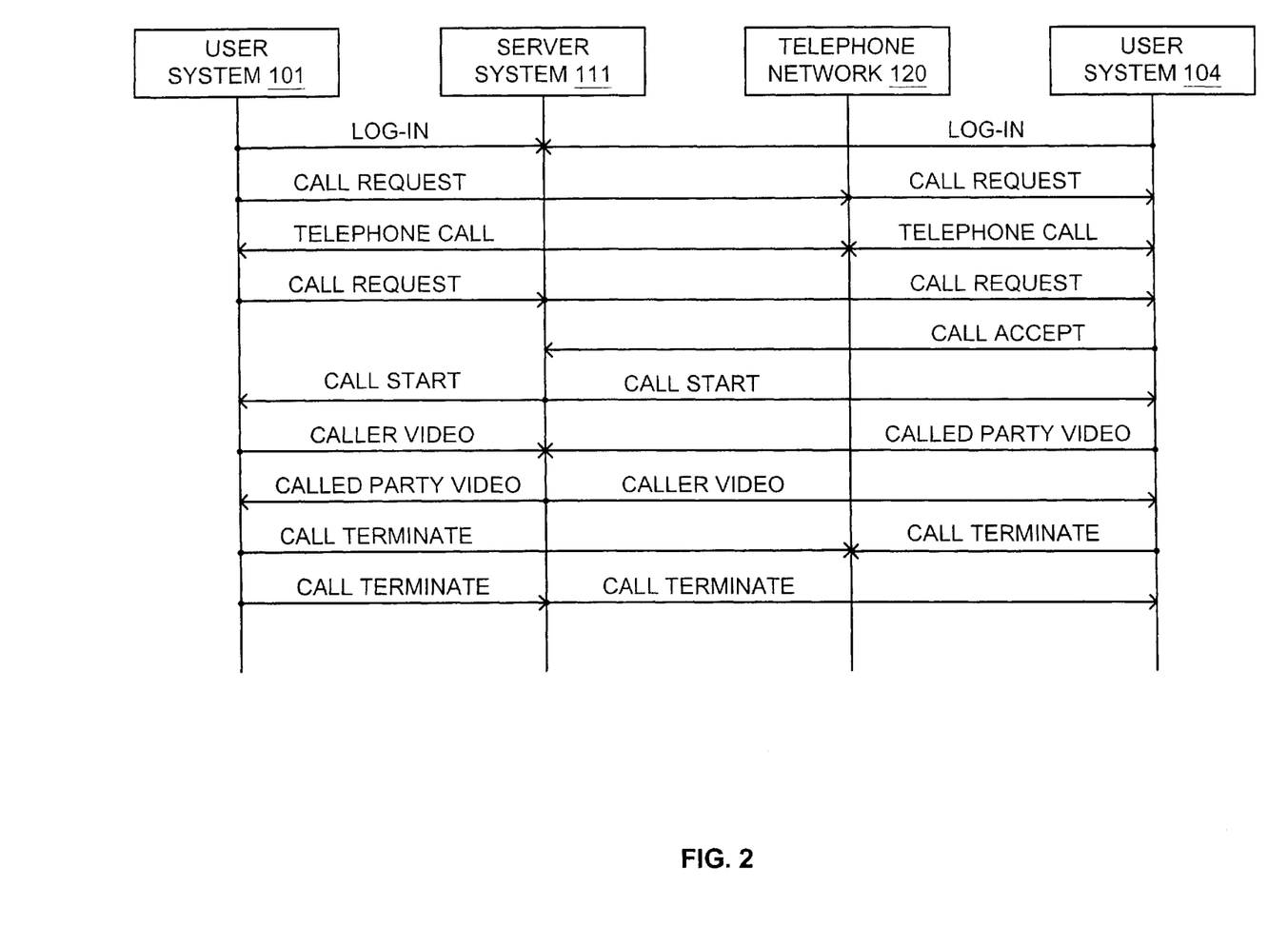
FIG. 2 illustrates video system operation in an example of the invention.

Video Telephony System Configuration and Operation—FIGS. 1–2

FIG. 1 illustrates video telephony system 100 in an example of the invention. Video telephony system 100 comprises user systems 101–104, public data network 110, server system 111, and public telephone network 120. User systems 101–104 communicate with one another and with server system 111 over public data network 110. User systems 101–104 also communicate with one another over public telephone network 120.

Although various systems could be used within the context of the invention, a few exemplary systems are given for illustrative purposes. Examples of public telephone network 120 include local and long distance telephone companies. Examples of public data network 111 include Internet service providers and the Internet. Server system 111 could be a conventional Internet server configured with software to implement the invention. User systems 101–104 could include a conventional telephone and personal computer in addition to special purpose circuitry and software to implement the invention.

FIG. 2 illustrates video system 100 operation in an example of the invention. Public data network 110 is not shown for clarity, although it should be appreciated that communications with server system 111 occur over public data network 110. Before a video call, both users systems 101 and 104 transfer log-in messages to server system 111 when they are ready to initiate and/or receive video calls. The log-in messages generally include user names and passwords, user data addresses and telephone numbers, and any video call preferences. Server system 111 checks the passwords against the user names, and if they are valid, associates each related user name/data address/telephone number with an indication that the user is ready to receive and/or initiate video calls. Server system 111 also logs any video call preferences.

Subsequently, user system 101 transfers a request for a telephone call over public telephone network 120 to user system 104. This telephone call request could be as simple as picking up a telephone and dialing a telephone number. Public telephone network 120 transfers a telephone call request to user system 104—typically by processing the dialed telephone number to a ring a telephone. If user system 104 grants the telephone call request, such as by answering the ringing telephone, a telephone call is established between user systems 101 and 104 over public telephone network 120.

In response to the telephone call request, user system 101 transfers a video call request to server system 111. The video call request has the called party telephone number, and some caller identification information, such as user name and password, user telephone number and data address, and any other video call parameters. One such parameter is whether the requested video call is bi-directional or unidirectional. Another parameter is the type of video compression and encryption that is used.

Server system 111 uses the called party telephone number to check if the called party is ready to receive video call requests, and since user system 104 has logged-in, server system 111 transfers a video call request to user system 104. User system 104 may then present the called party with a prompt, such as an instant message or tone, to accept the video call request. If the called party accepts the video call request, user system 104 transfers a video call acceptance to server system 111. The acceptance may also have video call preferences for the called party that server system 111 resolves against the preferences of the caller. Server system 111 transfers video call start messages to user systems 101 and 104 indicating the resolved video call parameters. In response to the video call start messages, user systems 101 and 104 generate and transfer video to server system 111. This transferred video has some indicia indicating the caller and called party, so server system 111 can associate the received video with the video call.

Server system 111 uses the user system 104 data address to transfer caller video to user system 104. Server system 111 uses the user system 101 data address to transfer called party video to user system 101. Prior to this transfer, server system may interwork the video to provide compatibility at the receiving end. User systems 101 and 104 receive and display the respective video to establish the video call.

Eventually, User systems 101 and 104 indicate telephone call termination to public telephone network 120—typically by hanging-up their telephones. In response to telephone call termination, user system 101 transfers a telephone call termination message to server system 111. In response, server system 111 transfers a video call termination message to user system 104, and systems 101, 104, and 111 terminate the video call. In some cases, user system 104 may detect telephone call termination and transfer a termination message to server system 111 to eliminate the need for the termination message from server system 111.

In one variation to the above system, the actual video transfer may be directly between user systems 101 and 104 over public data network 110. The server system 111 would set-up the video call and provide the appropriate data addresses to user systems 101 and 104 for a peer-to-peer video transfer over public data network 110.

General User System Configuration and Operation—FIGS. 3–6

Figure 3:
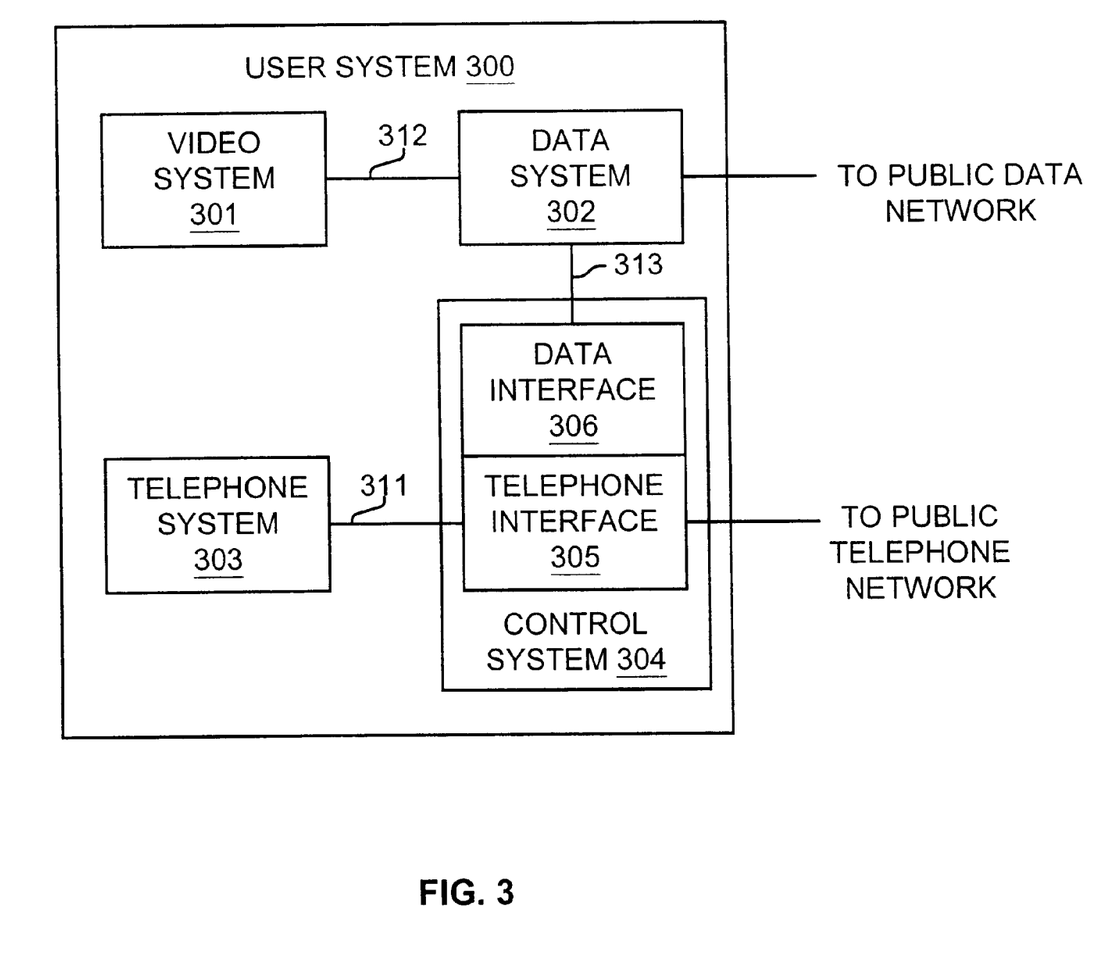
FIG. 3 illustrates a user system in an example of the invention.

FIG. 3 illustrates user system 300 in an example of the invention. User system 300 comprises video system 301, data communication system 302, telephone system 303, and control system 304. Control system 304 comprises telephone interface 305 and data interface 306. Data communication system 302 is coupled to a public data communication network, and telephone interface 305 is coupled to a public telephone network.

Video system 301 could be any system configured to generate and/or display video. Video system 301 may include a camera for generating video of a caller or called party. Video system 301 may include a television or computer monitor to display video. Telephone system 303 could be any system configured to initiate telephone calls over a public telephone network, and could be integrated into other systems, such as computers, appliances, and televisions. Telephone system 303 could utilize wireless, wire-line, optical, or other communication media. Control system 304 could be any system configured to initiate a video call using systems 301–302 in response to the initiation of a telephone call by telephone 303. Telephone interface 305 is configured to receive a called number from telephone system 303 if the telephone number is contemporaneously used to establish a telephone call over the public telephone network. In response to receiving the called telephone number, data interface 306 is configured to transfer the called telephone number to data communication system 302 for transfer to a server system over the public data network. Data system 302 could be any system configured to transfer the called telephone number to the server system over the public data network and to exchange video between the public data network and video system 301.

It should be appreciated that systems 301–304 could be integrated together or with other systems. Various combinations of equipment could be used to implement user system 300. Some examples of devices that could incorporate data system 302 include, but are not limited to, a computer, set-top box, telephone, network interface card, digital assistant, information appliance, and stand-alone device. Some examples of devices that could incorporate control system 304 include, but are not limited to, a computer, telephone, modem, network interface card, set-top box, and stand-alone device. In addition, the functionality of data system 302 and control system 304 could be provided by a processing system that retrieves and executes software that is stored on a storage system. The storage system could comprise a disk, tape, integrated circuit, server, or some other memory device.

Figure 4:
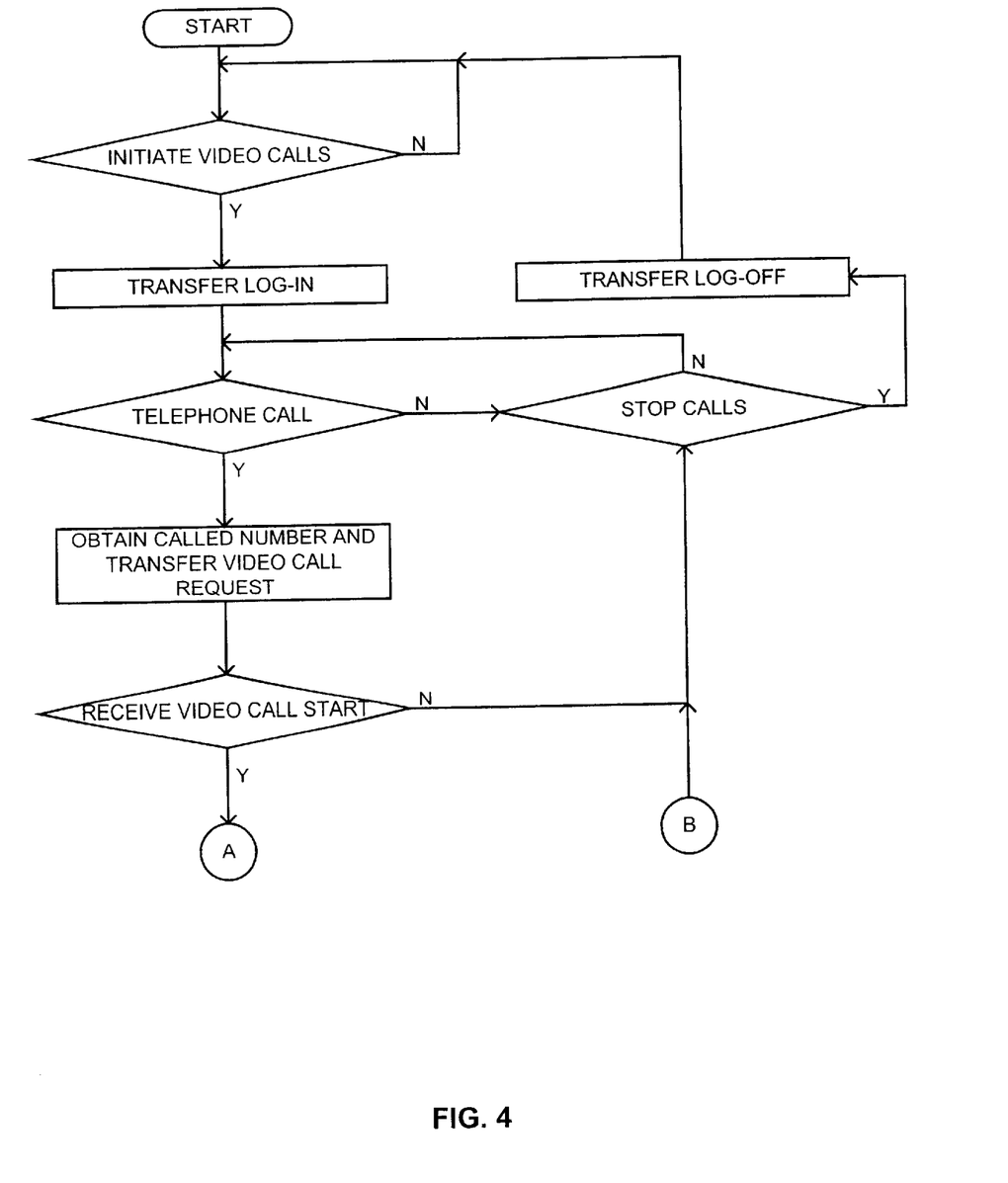
FIG. 4 illustrates user system operation in an example of the invention.
Figure 5:
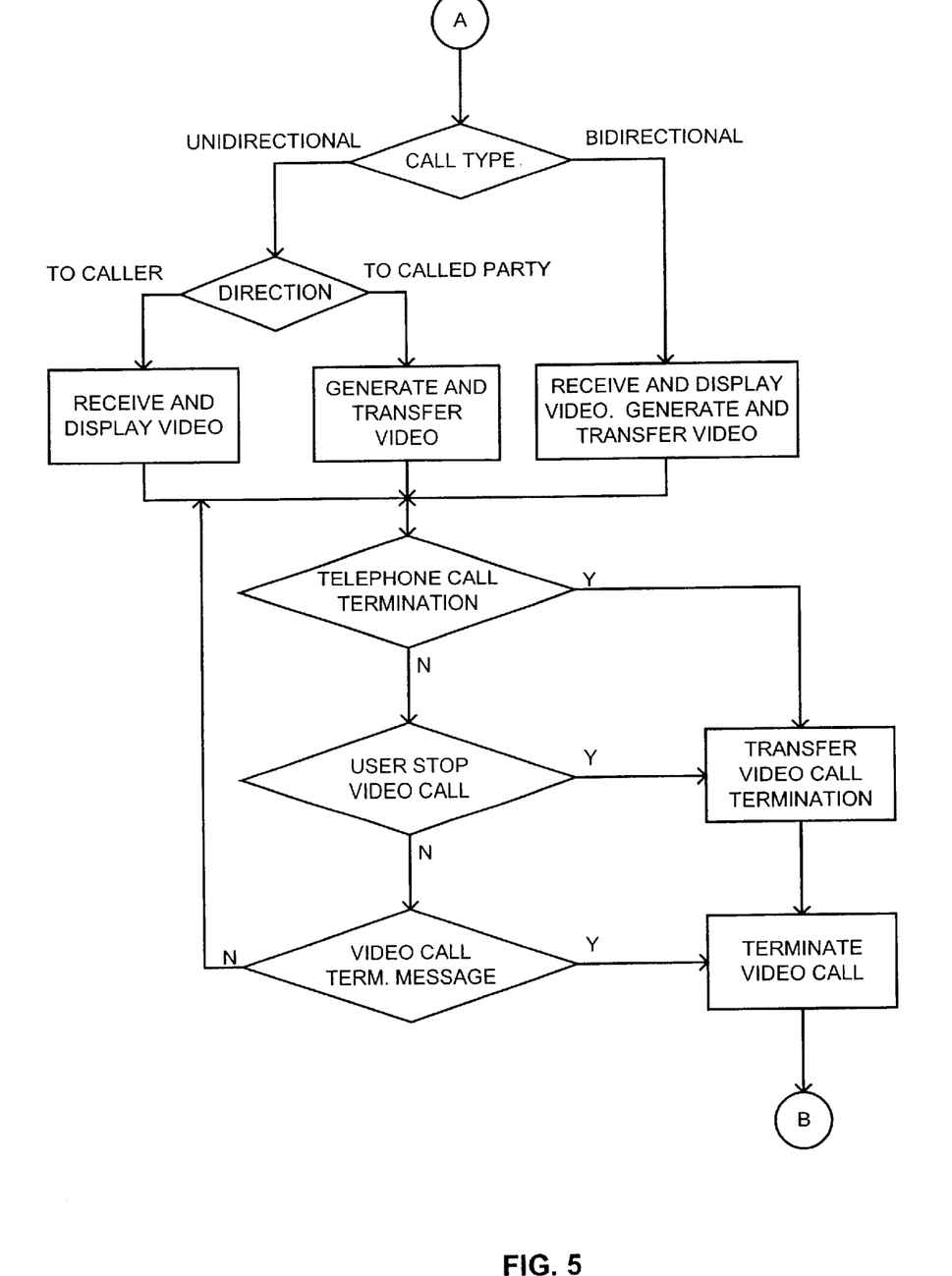
FIG. 5 illustrates user system operation in an example of the invention.

FIGS. 4–5 illustrates the operation for user system 300 to initiate video calls in an example of the invention. User system 300 awaits an indication from the caller to begin initiating video calls. This indication could be an input to any of systems 301–304. In response to the indication, data communication system 302 transfers a log-in message over the public data network to the server system. For example, data communication system 302 could be configured to automatically transfer the log-in message upon system start. The log-in message indicates that user system 300 is ready to initiate video calls, and possibly, to also receive video calls. The log-in message may include information such as the user name and password, user data address and telephone number, video call parameters, and other user data or registration information.

Telephone interface 305 awaits either a telephone call from telephone system 303 to the public telephone network or an indication from the caller to stop initiating video calls. If such a stop indication is received, data interface 302 transfers a log-off message to the server system. For example, data communication system 302 could be configured to automatically transfer the log-off message upon system shut-down. The log-off message indicates that user system 300 is not ready to initiate or receive video calls.

If telephone system 303 initiates a telephone call, telephone interface 305 obtains the called telephone number, and in response, data interface 306 transfers the called number to data communication system 302. Data communication system 302 transfers a video call request to the server system. The video call request includes the called telephone number and other information, such as the caller user name and password, caller telephone number and data address, and video call parameters. The video call parameters indicate if the requested video call is bi-directional or unidirectional, and the direction if unidirectional—caller to called party or called party to caller. The video call parameters may also indicate requested video quality and security. The information in the video call request is populated by control system 304 and/or data communication system 302.

Data communication system 302 then awaits a video call start message. If the video call start message is not received, for example if the video call is unavailable or rejected, telephone interface 305 awaits either a telephone call or an indication from the caller to stop initiating video calls. If received (See FIG. 5), the video call start message indicates the actual video call parameters for the video call. If the video call is bi-directional or uni-directional from caller to called party, then video system 301 generates video of the caller that data communication system 302 transfers the caller to the server system. If the video call is bi-directional or uni-directional from called party to caller, then data communication system 302 receives video from the server system that video system 301 displays. Systems 301–302 would typically apply compression, encryption, and other video technologies to the video.

At this point between the caller and called party, a telephone call exists over the public telephone network and a video call exists over the public data network. If the caller terminates the telephone call, such as by hanging up the telephone, telephone interface 305 determines that the telephone call has been terminated, and as a result, data interface 306 indicates the telephone call termination to data communication system 302. Data communication system 302 then transfers a video call termination message to the server system and video generation, transfer, receipt, and display are terminated by user system 300. The video call is similarly terminated if a video call termination message is received from the server system or if the caller indicates that the video call should be terminated. User system 300 then awaits an additional telephone call or an indication from the caller to stop initiating video call requests.

Figure 6:
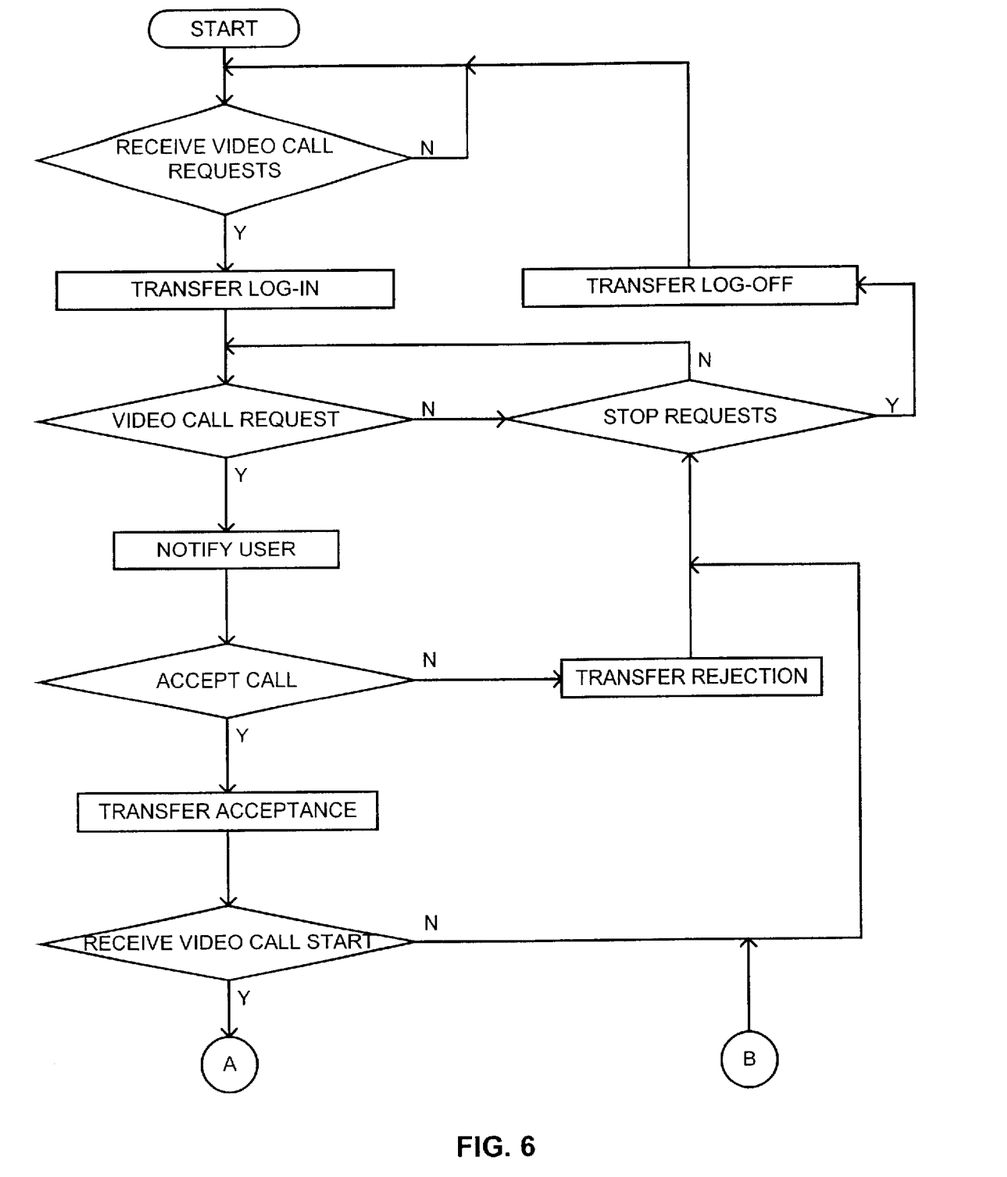
FIG. 6 illustrates user system operation in an example of the invention.

FIGS. 5–6 illustrates the operation for user system 300 to receive video calls in an example of the invention. On FIG. 6, user system 300 awaits an indication from the user to begin receiving video call requests. This indication could be an input to any of systems 301–304. In response to the start indication, data communication system 302 transfers a log-in message over the public data network to the server system. For example, data communication system 302 could be configured to automatically transfer the log-in message upon system start. The log-in message indicates that user system 300 is ready to receive video call requests, and may include information such as the user name and password, user data address and telephone number, video call parameters, and other user data or registration information.

Data interface 302 awaits a video call request from the server system or an indication from the user to stop receiving video call requests. If a stop indication is received, data interface 302 transfers a log-off message to the server system. For example, data communication system 302 could be configured to automatically transfer the log-off message upon system shut-down.

If data communication system 304 receives a video call request, then the user is notified of the requested video call. The notification could be given from any of systems 301–301 and could include screen displays, tones, or other user signals. Although not shown for clarity, telephone system 303 will receive a contemporaneous telephone call from the public telephone network. The user indicates if the telephone call and/or the video call is accepted. Typically, the telephone call is accepted by operating telephone system 303 to answer the call. The video call may be accepted with an input to one of systems 301–304, such as by pressing a DTMF key, pressing a button, or selecting from a screen display. User system 300 could be configured to automatically accept or reject the video call based on whether the corresponding telephone call is answered.

If the video call is not accepted, then data communication system 302 transfers a video call rejection to the server system and awaits either a video call request from the server system or an indication from the user to stop receiving video call requests. If the video call is accepted, then data communication system 302 transfers a video call acceptance to the server system. The video call acceptance may indicate accepted video call parameters. Data communication system 302 then awaits a video call start message indicating the actual parameters for the video call. If the video call start message is received, processing proceeds as indicated above for FIG. 5.

Figure 7:
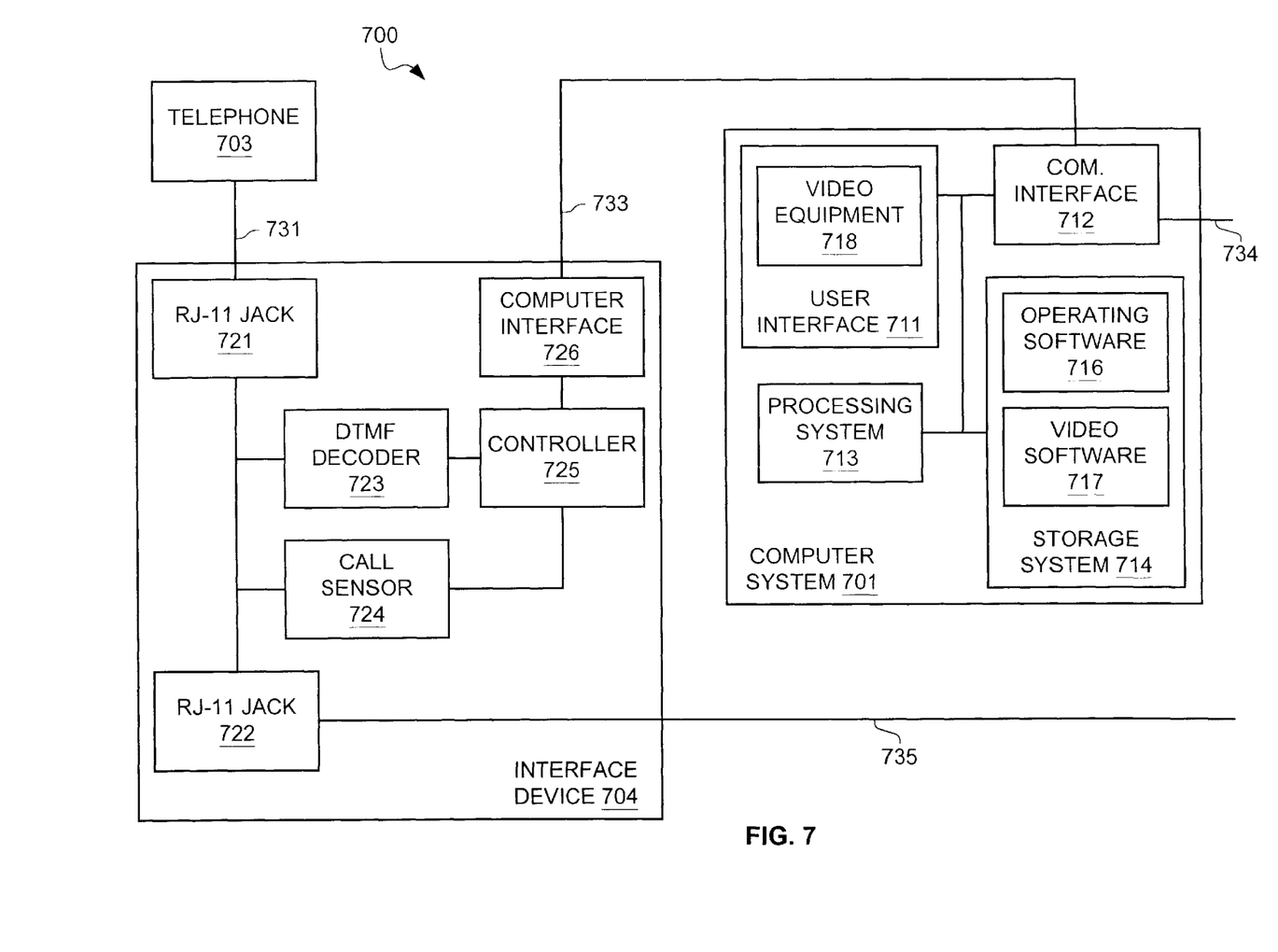
FIG. 7 illustrates a user system in an example of the invention.

User System Incorporating Conventional Telephone and Computer—FIG. 7

FIG. 7 illustrates user system 700 in an example of the invention. Advantageously, user system 700 is configured for use with conventional telephones, personal computers, and communication services. Advantageously, this makes video telephony easy for a user to implement by simply adding one small device to conventional devices and services.

User system 700 includes computer system 701, telephone 703, and interface device 704. Computer system 701 is connected to Internet link 734 that provides Internet service. Telephone 303 is connected to telephone link 731. Telephone link 735 provides telephone service. It should be appreciated that links 734–735 may share the same physical media, especially to egress the user premises.

Computer system 701 includes user interface 711, communication interface 712, processing system 713, and storage system 714. User interface 711 includes video equipment 718. Storage system 714 stores operating software 716 and video software 717. Interface device 704 includes RJ-11 jacks 721–722, Dual-Tone Multi-Frequency (DTMF) decoder 723, call sensor 724, controller 725, and computer interface 726. RJ-11 jack 721 is coupled to telephone 703 by telephone link 731. RJ-11 jack 722 is coupled to telephone link 735. Computer interface 726 is coupled to communication interface 712 by Universal Serial BUS (USB) 733. Alternatively, USB 733 could be a serial cable. Communication interface 712 is also coupled to Internet link 734. Computer system 701 uses Transaction Control Protocol port 80 or any other port assigned by the user to exchange messages with the server system.

User interface 711 includes a keyboard and mouse. Video equipment 718 includes a camera and monitor. Communication interface 712 includes a USB or serial port and a Digital Subscriber Line (DSL) modem or some other broadband access system. Processing system 713 includes a computer microprocessor and other circuitry. Storage system 714 includes a hard disk drive and other circuitry. Processing system 713 retrieves and executes operating software 716 and video software 717 from storage system 714. Software 716–717 could comprise an application program, firmware, or some other form of machine-readable processing instructions. Operating software 716 includes an operating system, networking software, and other utilities typically loaded onto a personal computer. When executed by processing system 713, video software 717 directs processing system 713 to operate in accord with the invention.

Interface device 704 could be a stand-alone enclosure that derives power from the telephone line, battery, AC connection, or another source. RJ-11 jacks 721–722, DTMF decoder 723, call sensor 724, and computer interface 726 could be conventional components. Controller 725 comprises processing circuitry configured to operate in accord with the invention. Interface device 704 can be turned on and off to control video call initiation.

In operation, operating software 716 directs processing system to retrieve and execute video software 717 in response to computer start-up or user input. Video software 717 directs processing system 713 to operate as follows. Processing system 713 maintains a set of user options that can be viewed and altered through user interface 711. A table of possible options follows.

| Task | Options |
| --- | --- |
| Log-in | Automatic at system start, upon user input, or upon incoming/outgoing telephone call. |
| Video call initiation | 1. On or off.<br>2. If on, then automatic, automatic using a positive or negative telephone number list, or after user prompt and acceptance.<br>3. Bi-directional or unidirectional, and if unidirectional, then caller to called party or called party to caller. |
| Video call reception | 1. On or off.<br>2. If on, then automatic, automatic using a positive or negative telephone number list, or after user prompt and acceptance.<br>3. Bi-directional or unidirectional, and if unidirectional, then caller to called party or called party to caller. |
| Encryption | 1. On or off.<br>2. If on, then automatic, automatic using a positive or negative telephone number list, or after user prompt and acceptance. |
| Video quality | 1. Various standards that can be used based video transfer or receipt, positive or negative telephone number list, or after user prompt and selection. |

Processing system 713 generates and transfers a log-in message through communication interface and over the public data network to the server system. The log-in message include user name and password, user telephone number and data address, and video call parameters.

Telephone 703 is operated to transfer DTMF digits to the public telephone network. The public telephone network processes the DTMF digits to extend the call to the called party. DTMF decoder 723 monitors the telephone connection between jacks 721–722 to detect and decode any DTMF tones transmitted by telephone 703 to the public telephone network. DTMF decoder 723 indicates the decoded digits to controller 725. Controller 725 forms the called number from the decoded digits and transfers a telephone call initiation message through computer interface 726 and USB connection 733.

Processing system 713 receives the telephone call initiation message from communication interface 712. Processing system 713 implements the video call initiation options, and if the video call should proceed, processing system 713 generates a video call request including the called telephone number, user name and password, user data address and telephone number, and video call parameters. Processing system 713 transfers the video call request message through communication interface 712 to Internet link 734 for delivery to the server system over the Internet. Processing system 713 then awaits a video call start message from the server system with the parameters for the video call. When the video call start message is received, processing system implements the video call parameters and user options. For a bi-directional video call, processing system 713 directs the exchange of video between video equipment 718 and Internet link 734. Video equipment 718 displays the video.

Eventually, telephone 703 is placed on-hook. Call sensor 724 monitors the telephone connection between jacks 721–722 to detect the on-hook condition. Typically, call sensor 724 monitors line current to detect off-hook and on-hook conditions. Call sensor 724 indicates the on-hook condition to controller 725. Controller 725 transfers a telephone call termination message through computer interface 726 and USB connection 733.

Processing system 713 receives the telephone call termination message through communication interface 712. In response, processing system 713 generates and transfers a video call termination message through communication interface 712 to Internet link 734 for delivery to the server system over the Internet. Processing system 713 directs video equipment 718 to stop the generation and display of video.

It should be appreciated that the user may operate their telephone in the normal manner and corresponding video calls are automatically established over the Internet. The telephone calls provides the audio, and the Internet connection transfers the video. As indicated, options are available to exert various levels of user control over the process.

To receive a video call, processing system 713 receives a video call request from the server system over Internet link 734 and through communication interface 712. Processing system 713 implements any user options and may notify the user through user interface 711 or video equipment 718. If the video call is accepted, processing system 713 transfers a video call acceptance to the server system through communication interface 712 and over Internet link 734.

When the video call start message is received, processing system 713 implements the video call parameters and user options. For a bidirectional video call, processing system 713 directs the exchange of video between video equipment 718 and Internet link 734. Video equipment 718 displays the video. Video call termination may proceed as indicated above or a video call termination message may be received from the server system. If a video call termination message is received, then processing system 713 directs video equipment 718 to stop the generation and display of video.

It should be appreciated that the user may invoke video software 717 to dynamically control video calls. For example, video software 717 may allow the user to terminate video calls in one or both directions during the call. Video software 717 may allow the user to adjust user options during the call. Video software 717 may allow the user to initiate a previously rejected video call during the telephone call.

Computer system 701, telephone 703, and interface device 704 can be configured to operate together for additional user control. In such a scenario, the user could transfer DTMF digits that are decoded by interface device 704 and transferred to computer system 701 to exert control. For example, incoming video calls could be accepted or rejected by transferring specific DTMF sequences from telephone 703. Video calls could be terminated by the user in a similar fashion.

Interface device 704 could be further equipped with a tone generator to alert the user to various conditions. For example, interface device 704 could transfer a special tone to telephone link 731 for the user to hear to indicate that a video call is available for the telephone call. The tone could be played in response to a video call request or start message from the server system.

Figure 8:
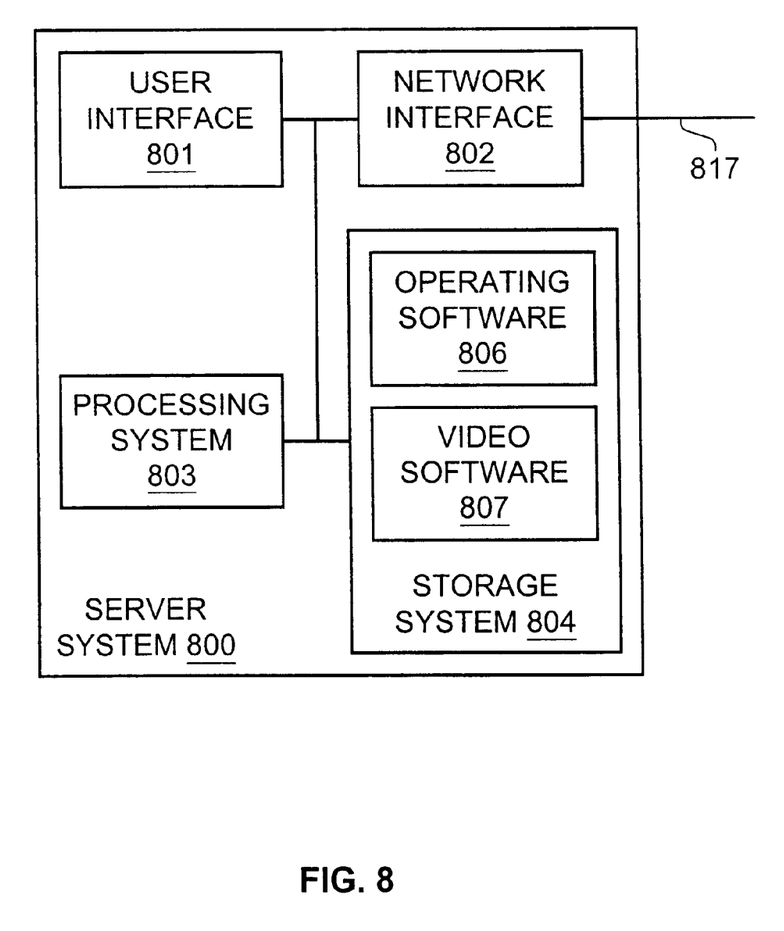
FIG. 8 illustrates a server system in an example of the invention.
Figure 9:
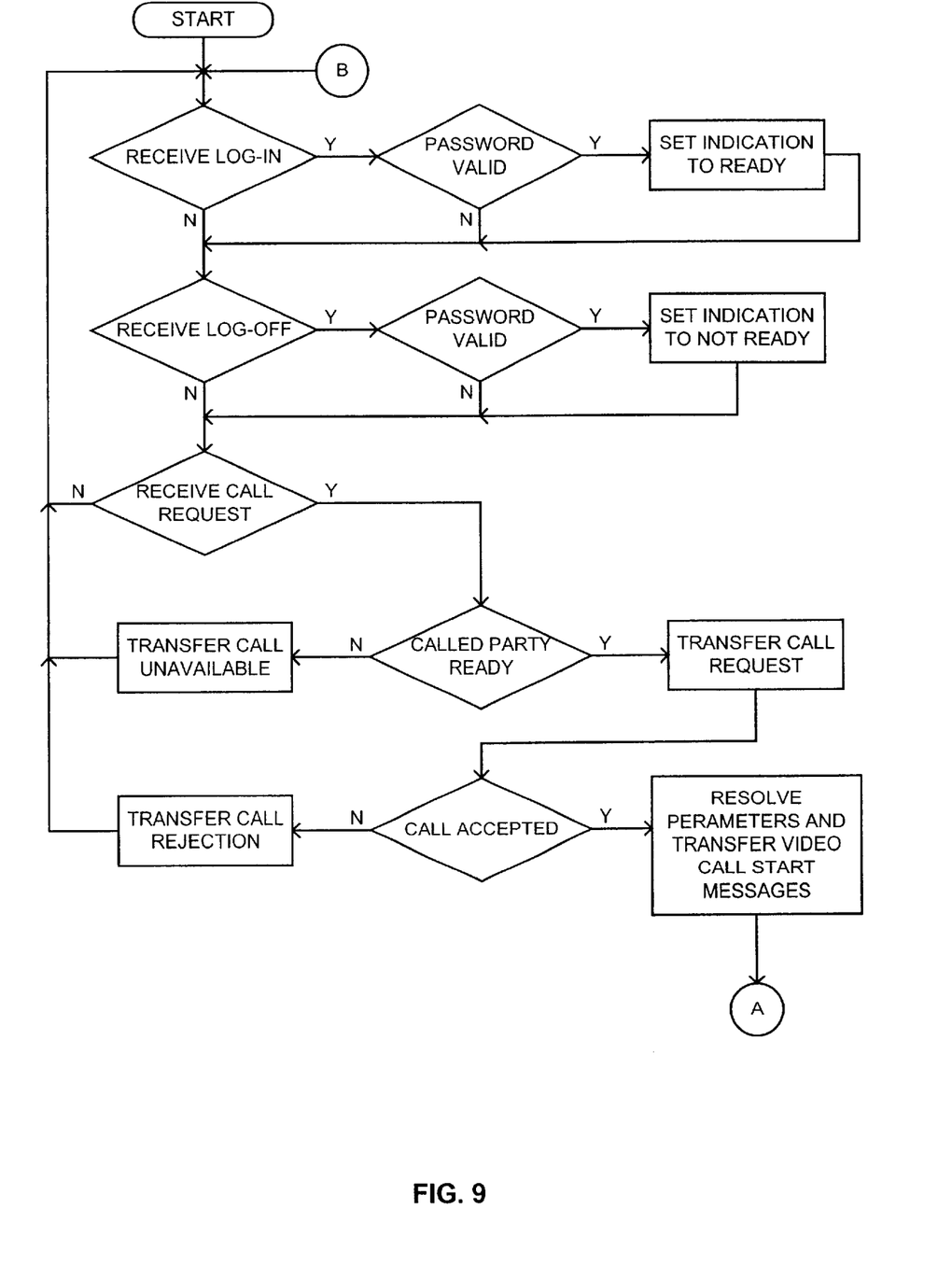
FIG. 9 illustrates server system operation in an example of the invention.
Figure 10:
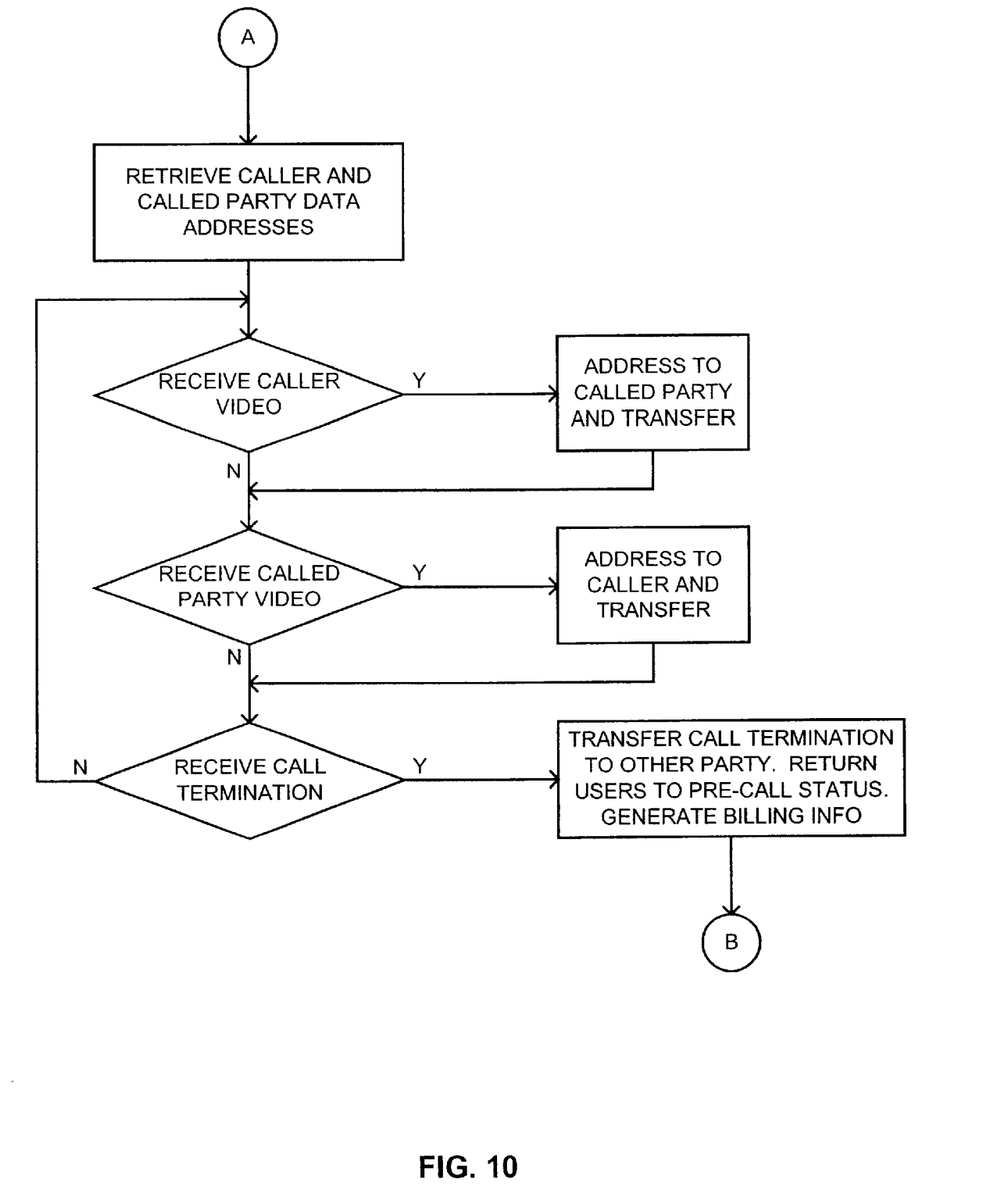
FIG. 10 illustrates server system operation in an example of the invention.

Server System—FIGS. 8–10

FIG. 8 illustrates server system 800 in an example of the invention. Server system 800 includes user interface 801, network interface 802, processing system 803, and storage system 804. Storage system 804 stores operating software 806 and video software 807. Network interface 802 is coupled to Internet connection 817. Processing system 803 uses network interface 802 to communicate over the Internet with user systems.

Processing system 803 retrieves and executes operating software 806 and video software 807 from storage system 804. Software 806–807 could comprise an application program, firmware, or some other form of machine-readable processing instructions. Operating software 806 includes an operating system, networking software, and other utilities typically loaded onto an Internet server. When executed by processing system 803, video software 807 directs processing system 803 to control server system 800 in accord with the invention.

FIGS. 9–10 illustrate server system 800 operation in an example of the invention. Server system 800 maintains a database of users including user names and passwords, user telephone numbers and data addresses, and possibly user preferences. If server system 800 receives a log-in message, the user password is checked and if it is valid, the user database is modified to indicate that the user is ready to initiate and/or receive video calls. If server system 800 receives a log-off message, then the user password is checked and if it is valid, the user database is modified to indicate that the user is not ready to initiate and/or receive video calls. The user database may also be modified by querying the users and receiving responses indicating user video call specifications.

If server system 800 receives a video call request, the user database is checked using the called telephone number from the request to determine if the called party is ready to receive video calls. If not, a video call unavailable message is returned to the caller. If so, server system 800 sends a video call request to the called party. If a video call rejection is received from the called party, then server system 800 sends a video call rejection to the caller. If a video call acceptance is received from the called party, server system resolves video call parameters and sends video call start messages to both the caller and called party including the video call parameters. Parameter resolution may entail determining if the caller will receive called party video. If so, this is indicated in the video start messages.

Server system 800 uses the called party telephone number to retrieve the called party data address. Server system 800 may use the caller telephone number to retrieve the caller data address. If server system 800 receives video from the caller, it addresses the caller video to the called party data address and transfers the caller video for delivery to the called party. If server system 800 receives video from the called party, it addresses the called party video to the caller data address and transfers the called party video for delivery to the caller. In some cases, it may be necessary for processing system 803 to interwork the video so it is compatible with both caller and called party. For example, the caller and called party may use different quality or encryption levels that are interworked by processing system 803.

If server system 800 receives a video call termination message from one user, it transfers a video call termination message to the other user. Server system 800 then modifies the database to return each user to their pre-call status. Server system also generates billing information for the video call.

Server system 800 may be configured to download software to the user systems. The software could be the video software used to control the user systems as described above. The software could provide upgrades from older versions. The software could provide video processing, compression, and encryption. The software could provide system diagnostics and trouble-shooting to recommend optimal system software and settings.

It should be appreciated that the processing and control discussed above could be distributed in various ways between the user system and the server system. For example, the server system could maintain and implement user preferences and provide user prompts.

What is claimed is:

1. A method of operating a user system for video telephony, the method comprising:

receiving a called telephone number contemporaneously used to establish a telephone call between a caller and a called party over a public telephone network wherein the caller is associated with a caller telephone number and the called party is associated with the called telephone number;

in response to receiving the called number, generating and transferring a first message to a public data network for delivery to a server system connected to said public data network wherein the first message indicates the called telephone number, the called party having previously interacted with the server system to indicate a data address of the called party, and the server system having stored the called party data address;

receiving and processing a second message from the public data network indicating that caller video can be transferred;

in response to processing the second message, transferring caller video to the public data network for delivery to the called party.

2. The method of claim 1 wherein the public data network delivers the caller video to the server system, and the server system transfers the caller video over the public data network to the called party.

3. The method of claim 1 further comprising receiving called party video from the public data network, displaying the called party based on the called party video, and generating the caller video.

4. The method of claim 1 wherein the first message indicates the caller telephone number.

5. The method of claim 1 wherein receiving the called telephone number comprises decoding dual-tone multi-frequency tones to determine the called telephone number.

6. The method of claim 1 further comprising generating and transferring a third message to the public data network for delivery to the server system wherein the third message indicates that the telephone call is terminated.

7. The method of claim 6 further comprising detecting an on-hook condition, and wherein the third message is generated and transferred in response to the on-hook condition.

8. A user system for video telephony, the user system comprising:

a control system configured to receive a called telephone number contemporaneously used to establish a telephone call between a caller and a called party over a public telephone network wherein the caller is associated with a caller telephone number and the called party is associated with the called telephone number; and a data communication system configured to generate and transfer a first message indicating the called telephone number to a public data network for delivery to a server system connected to the public data network in response to receipt of the called number, to receive and process a second message from the public data network indicating that caller video can be transferred if the called party has previously interacted with the server system to indicate a data address of the called party, and in response to the second message, to transfer caller video to the public data network for delivery to the called party.

9. The user system of claim 8 wherein the public data network delivers the caller video to the server system, and the server system transfers the caller video over the public data network to the called party.

10. The user system of claim 8 wherein the data communication system is configured to receive called party video from the public data network, and further comprising a video system configured to display the called party based on the called party video and to generate the caller video.

11. The user system of claim 8 wherein the first message indicates the caller telephone number.

12. The user system of claim 8 wherein the control system is configured to decode dual-tone multi-frequency tones to determine the called telephone number.

13. The user system of claim 8 wherein the data communication system is configured to generate and transfer a third message to the public data network for delivery to the server system wherein the third message indicates that the telephone call is terminated.

14. The user system of claim 13 wherein the control system is configured to detect an on-hook condition, and the data communication system is configured to generate and transfer the third message in response to the on-hook condition.

15. A software product for video telephony, the software product comprising:

software configured to direct a processing system to receive a called telephone number contemporaneously used to establish a telephone call between a caller and a called party over a public telephone network wherein the caller is associated with a caller telephone number and the called party is associated with the called telephone number, to generate and transfer a first message indicating the called telephone number to a public data network for delivery to a server system connected to the public data network in response to receipt of the called number, to receive and process a second message from the public data network indicating that caller video can be transferred if the called party has previously interacted with the server system to indicate a data address of the called party, and in response to the second message, to receive caller video from a video system and transfer the caller video to the public data network for delivery to the called party; and a storage system that stores the software.

16. The software product of claim 15 wherein the public data network delivers the caller video to the server system, and the server system transfers the caller video over the public data network to the called party.

17. The software product of claim 15 wherein the software is configured to direct the processing system to receive called party video from the public data network and to transfer the called party video to the video system to display the called party.

18. The software product of claim 15 wherein the first message indicates the caller telephone number.

19. The software product of claim 15 wherein the software is configured to direct the processing system to generate and transfer a third message to the public data network for delivery to the server system wherein the third message indicates that the telephone call is terminated.

20. A method of operating a server system for video telephony, the method comprising:

interacting with a data network user to store a respective telephone number and data address of the data network user;

receiving a first message indicating a called telephone number from a public data network wherein a caller is associated with a caller data address and a caller telephone number, wherein a called party is associated with a called party data address and the called telephone number, wherein the first message is received from the caller data address, and wherein the called telephone number is contemporaneously used to establish a telephone call between the caller and the called party over a public telephone network;

processing the called telephone number from the first message to determine the called party data address if the called telephone number matches a stored telephone number of an interacting data network user; and if the called party data address is determined, transferring a second message to the public data network for delivery to the called party wherein the second message indicates that the caller video will be transferred to the called party, and transferring a third message to the public data network for delivery to the caller wherein the third message indicates that the caller video will be delivered to the called party.

21. The method of claim 20 further comprising receiving the caller video from the public data network, addressing the caller video to the called party data address, and transferring the caller video to the public data network.

22. The method of claim 20 further comprising determining if the caller will receive called party video, and if the caller will receive the called party video, then the second message and the third message indicate that the called party video will be delivered to the caller.

23. The method of claim 22 further comprising receiving the called party video from the public data network, addressing the called party video to the caller data address, and transferring the called party video to the public data network.

24. The method of claim 20 wherein determining if the called party will receive the caller video comprises transferring a request to the public data network for delivery to the called party and receiving a response from the public data network granting the request.

25. A server system for video telephony, the server system comprising:

a processing system configured to interacting with a data network user to store a respective telephone number and data address of the data network user, receive a first message indicating a called telephone number wherein a caller is associated with a caller data address and a caller telephone number, wherein a called party is associated with a called party data address and the called telephone number, and wherein the called telephone number is contemporaneously used to establish a telephone call between the caller and the called party over a public telephone network, to process the called telephone number from the first message to determine the called party data address if the called telephone number matches a stored telephone number of an interacting data network user, and if the called party data address is determined, to transfer a second message for delivery to the called party and a third message for delivery to the caller wherein the second message and the third message indicate that the caller video will be transferred to the called party; and a network interface configured to receive the first message from a public data network and transfer the second message and the third message to the public data network.

26. The server system of claim 25 wherein the network interface is configured to exchange the caller video with the public data network and the processing system is configured to address the caller video to the called party data address.

27. The server system of claim 26 wherein the network interface is configured to exchange the called party video with the public data network and the processing system is configured to address the called party video to the caller data address.

28. The server system of claim 25 wherein the processing system is configured to determine if the caller will receive called party video, and if the caller will receive the called party video, then to generate the second message and the third message to indicate that the called party video will be transferred to the caller.

29. The server system of claim 25 wherein the processing system is configured to transfer a request for the called party and receive a response from the called party to determine if the called party will receive the caller video, and the network interface is configured to transfer the request to the public data network and receive the response from the public data network.

30. A software product for a server system to provide video telephony, the software product comprising:

software configured to direct the server system to interact with a data network user to store a respective telephone number and data address of the data network user, receive a first message from a public data network indicating a called telephone number wherein a caller is associated with a caller data address and a caller telephone number, wherein a called party is associated with a called party data address and the called telephone number, and wherein the called telephone number is contemporaneously used to establish a telephone call between the caller and the called party over a public telephone network, to process the called telephone number from the first message to determine if the called party will receive caller video, and if the called party will receive the caller video, to transfer a second message to the public data network for delivery to the called party and transfer a third message to the public data network for delivery to the caller wherein the second message and the third message indicate that the caller video will be transferred to the called party; and a storage system that stores the software.

31. The software product of claim 30 wherein the software is configured to direct the aver system to receive the caller video from the public data network, address the caller video to the called party data address, and transfer the caller video to the public data network for delivery to the called party.

32. The software product of claim 30 wherein the software is configured to direct the server system to determine if the caller will receive called party video, and if the caller will receive the called party video, then to generate the second message and the third message to indicate that the called party video will be transferred to the caller.

33. The software product of claim 32 wherein the software is configured to direct the server system to receive the called party video from the public data network, address the called party video to the caller data address, and transfer the called party video to the public data network for delivery to the caller.

34. The software product of claim 30 wherein the software is configured to direct the server system to process the called telephone number to retrieve the called party data address.

35. The software product of claim 30 wherein the software is configured to direct the server system to transfer a request to the public data network for the called party and receive a response from the public data network from the called party to determine if the called party will receive the caller video.

36. A method of operating a server system for video telephony, the method comprising:

maintaining a database of user telephone numbers and associated user data addresses, wherein the database is accessible via a public data network and wherein the user telephone numbers and associated user data addresses are configurable by the respective users;

maintaining individual indications if individual ones of the users will receive video; and establishing video exchanges between callers and called parties over a public data network in response to messages indicating called telephone numbers contemporaneously used to establish telephone calls between the callers and the called parties over a public telephone network.

37. The method of claim 36 wherein establishing the video exchanges comprises receiving the video from the public data network into the server system, addressing the video from the callers to the called parties, addressing the video from the called parties to the callers, and transferring the video to the public data network for delivery to the callers and called parties based on the addressing.

38. The method of claim 36 wherein establishing the video exchanges comprises processing the called telephone numbers to retrieve called party data addresses.

39. The method of claim 36 wherein establishing the video exchanges comprises processing caller telephone numbers to retrieve caller data addresses.

40. The method of claim 36 wherein maintaining the individual indications comprises transferring requests to the public data network for delivery to the users and receiving responses from the public data network from the users.

41. A server system for video telephony, the server system comprising:

a processing system configured to maintain a database of user telephone numbers and associated user data addresses, maintain individual indications if individual ones of the users will receive video, and establish video exchanges between callers and called parties over a public data network in response to messages indicating called telephone numbers contemporaneously used to establish telephone calls between the callers and the called parties over a public telephone network, wherein the database is accessible via the public data network and wherein the user telephone numbers and associated user data addresses are configurable by the respective users; and a network interface configured to receive the messages from the public data network.

42. The server system of claim 41 wherein the processing system is configured to address the video from the callers to the called parties and address the video from the called parties to the callers, and wherein the network interface is configured to receive the video from the public data network and transfer the video to the public data network for delivery to the callers and called parties based on the addressing.

43. The server system of claim 41 wherein the processing system is configured to process the called telephone numbers to retrieve called party data addresses.

44. The server system of claim 41 wherein the processing system is configured to process caller telephone numbers to retrieve caller data addresses.

45. The server system of claim 41 wherein the processing system is configured to transfer requests for delivery to the users and receive responses from the users to maintain the individual indications, and wherein the network interface is configured to transfer the requests to the public data network and receive the responses from the public data network.

46. A software product for a server system to provide video telephony, the software product comprising:

software configured to direct the server system to maintain a database of user telephone numbers and associated user data addresses, maintain individual indications if individual ones of the users will receive, video, and establish video exchanges between callers and called parties over a public data network in response to messages from the public data network indicating called telephone numbers contemporaneously used to establish telephone calls between the callers and the called parties over a public telephone network, wherein the database is configured to be accessible via the public data network and wherein the user telephone numbers and associated user data addresses are configurable by the respective users via the public data network; and a storage system that stores the software.

47. The software product of claim 46 wherein the software is configured to direct the server system to receive the video from the public data network, address the video from the callers to the called parties and address the video from the called parties to the callers, and transfer the video to the public data network for delivery to the callers and called parties based on the addressing.

48. The software product of claim 46 wherein the software is configured to direct the server system to process the called telephone numbers to retrieve called party data addresses.

49. The software product of claim 46 wherein the software is configured to direct the server system to process caller telephone numbers to retrieve caller data addresses.

50. The software product of claim 46 wherein the software is configured to direct the server system to transfer requests to the public data network for delivery to the users and receive responses from the public data network from the users to maintain the individual indications.

51. A method of operating a user device to monitor information concerning user telephone communications for initiating a simultaneous exchange of video via a public data network between the user and a called party, wherein the user device comprises an enclosure comprising first and second telephone jacks for coupling the user device into the telephone line and a port for coupling the user device to a computer connection, the method comprising:

monitoring the telephone line to detect dual-tone multi-frequency signals indicating a called telephone number contemporaneously being used to establish a telephone call between the user and the called party over a telephone network;

generating and transferring a first message over the computer connection to a user computer system to indicate the called telephone number;

monitoring the telephone line to detect an on-hook condition; and generating and transferring a second message over the computer connection to the user computer system to indicate the on-hook condition.

52. A user device to monitor information concerning user telephone communications for initiating a simultaneous exchange of video via a public data network between the user and a called party, wherein the user device comprises an enclosure comprising first and second telephone jacks for coupling the user device into the telephone line and a port for coupling the user device to a computer connection, the user device comprising:

a telephone interface configured to monitor the telephone line to detect dual-tone multi-frequency signals indicating a called telephone number contemporaneously being used to establish a telephone call between the user and the called party over a telephone network, and to monitor the telephone line to detect an on-hook condition; and     a data interface configured to generate and transfer a first message over the computer connection to a user computer system to indicate the called telephone number and a second message over the computer connection to a user computer system to indicate the on-hook condition.

53. A video telephone system comprising:

a caller user system including a control system configured to receive a called telephone number contemporaneously used to establish a telephone call between a caller and a called party over a public telephone network wherein the caller is associated with a caller telephone number and the called party is associated with the called telephone number, the caller user system further including a first data communication system configured to generate and transfer a first message indicating the called telephone number to a public data network in response to receipt of the called number, to receive and process a second message from the public data network indicating that caller video can be transferred, and in response to the second message to transfer caller video to the public data network for delivery to the called party;

a server system including a processing system configured to store respective telephone numbers and data addresses of data network users, receive the first message indicating a called telephone number wherein a called is associated with a caller data address and a caller telephone number, wherein a called party is associated with a called party data address and the called telephone number, and wherein the called telephone number is contemporaneously used to establish a telephone call between the caller and the called party over a public telephone network, to process the called telephone number from the first message to determine the called party data address if the called telephone number matches a stored telephone number of a data network user, and if the called party data address is determined, to transfer a second message for delivery to the called party and a third message for delivery to the caller wherein the second message and the third message indicate that the called video will be transferred to the called party, said server system further including a network interface configured to receive the first message from a public data network and transfer the second message and the third message to the public data network; and a called user system including a second data communication system for interacting with said server system to configure a respective telephone number and data address for the called party prior to the caller establishing the telephone call.

54. The system of claim 53 wherein the called party is logged-in on the server system when the caller establishes the telephone call.

* * * * *